March 8, 1927.
A. J. SORENSEN
1,620,169
APPARATUS FOR TRANSMITTING CODED CURRENTS
Filed Jan. 29, 1926
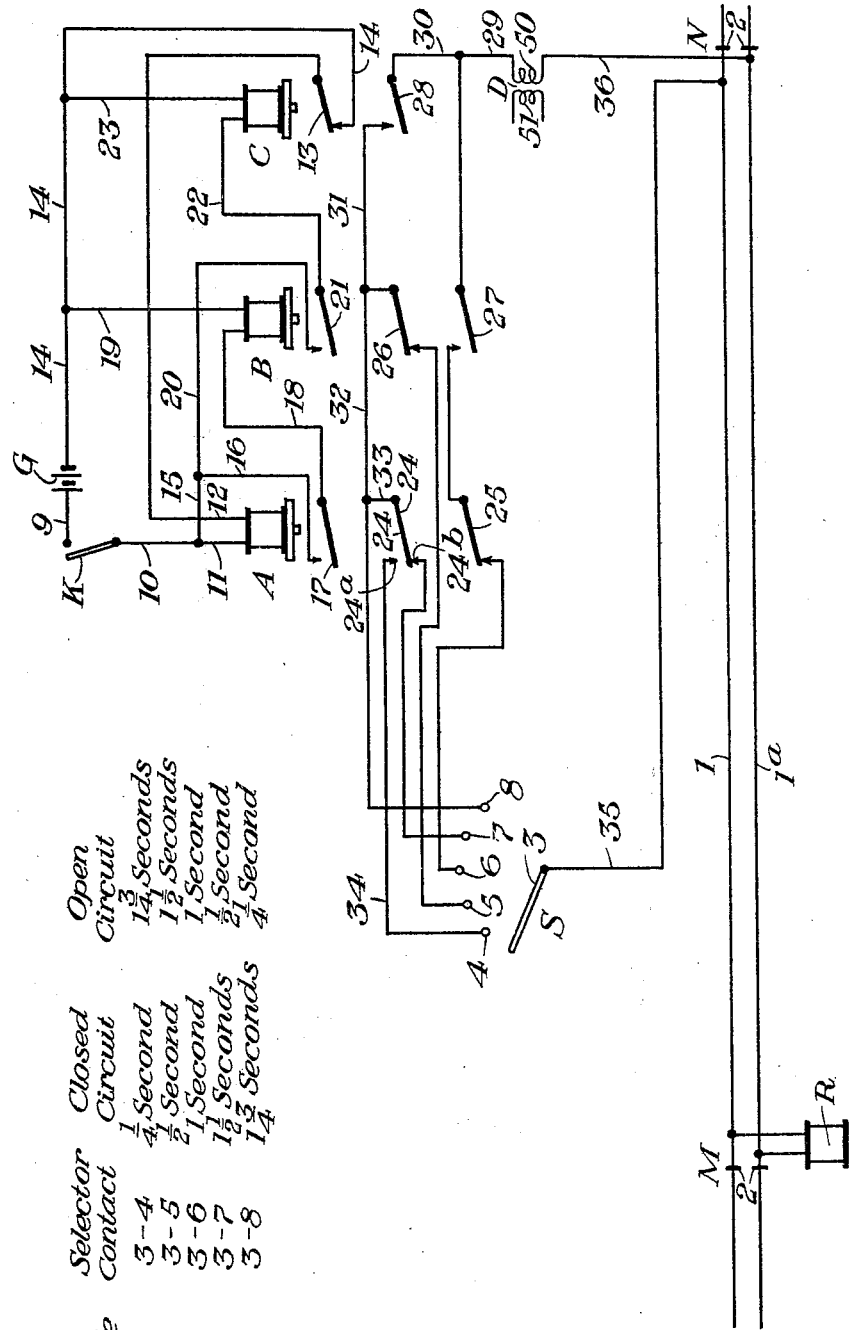
INVENTOR:
A. J. Sorensen,
BY A. L. Vencill
His ATTORNEY Patented Mar. 8, 1927.

1,620,169

UNITED STATES PATENT OFFICE.

ANDREW J. SORENSEN, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

APPARATUS FOR TRANSMITTING CODED CURRENTS.

Application filed January 29, 1926. Serial No. 84,592.

My invention relates to apparatus for transmitting coded currents. Apparatus embodying my invention is particularly suitable for, though in no way limited to, automatic train control systems, in which systems the transmitting apparatus is used to supply the coded currents to the rails of the trackway.

I will describe one form of transmitting apparatus embodying my invention, and will then point out the novel features thereof in claims.

The accompanying drawing is a diagrammatic view illustrating one form of transmitting apparatus embodying my invention.

Referring to this drawing, the reference characters 1 and 1ª designate the track rails of a stretch of railway track. A portion of this stretch is divided, by means of insulated joints, to form a track section M—N. A track relay R is connected across the rails adjacent one end of the section M—N and may be used to control traffic governing apparatus not shown in the drawing, in any desired manner.

The code transmitting apparatus comprises a series of slow acting relays, here shown as three in number, A, B and C. These relays are controlled by a circuit controller K which will usually be controlled in actual practice in accordance with traffic conditions. When circuit controller K is open, relays A, B and C are all de-energized. When circuit controller K is closed, however, current flows from a suitable source of energy, such as a battery G, through wire 9, circuit controller K, wires 10 and 11, winding of relay A, wire 12, back contact 13 of relay C and wire 14, back to battery G. Relay A therefore becomes energized and closes its front contacts. The closing of front contact 17 of relay A completes the circuit for relay B which circuit is from battery G, through wire 9, circuit controller K, wires 10, 15, and 16, front contact 17 of relay A, wire 18, winding of relay B, and wires 19 and 14, back to battery G. Relay B therefore becomes energized and closes a circuit for relay C which may be traced from battery G, through wire 9, circuit controller K, wires 10, 15 and 20, front contact 21 of relay B, wire 22, winding of relay C and wires 23 and 14 back to battery G. When relay C becomes energized, back contact 13 thereon opens the circuit for relay A. Relay A then opens its front contact 17 so that relay B becomes de-energized, and when relay B opens its front contacts 21, relay C becomes de-energized, thereby re-closing back contact 13 of relay C and re-establishing the circuit for relay A. It will be plain from the foregoing that when circuit controller K is closed, relays A, B and C are repeatedly energized and de-energized in cascade.

The slow acting relays A, B and C may have any desired characteristics. For example, I will assume that the relays shown in the drawing are constructed to have quick pick-up and slow release. Thus, relay A may require one-fourth second following de-energization of the relay, before the relay opens. Similarly, the time of release of relay B may be one second and the time of release of relay C may be one-half second. The relays each require only a small fraction of a second for pick-up and the time required for all three relays to pick up in succession is about one-fourth second. The total time of a complete cycle of operation, that is, the time required for all the relays to become successively energized and de-energized, is therefore about two seconds.

Current is supplied to the rails of section M—N from a suitable source of energy, here shown as a transformer D comprising a secondary 50 and a primary 51 constantly supplied with alternating current from a source not shown in the drawing. The secondary 50 of transformer D is at times connected with the rails of the section, by means described hereinafter, over suitable contacts or combinations of contacts on relays A, B and C.

The reference character S designates a selector comprising a movable lever 3 and a plurality of fixed contacts 4, 5, 6, 7, and 8, arranged to be separately engaged by the lever 3. When selector S is open, as shown in the drawing, secondary 50 of transformer D is disconnected from rail 1 of section M—N. When contact 3—4 of selector S is closed, a circuit is established from secondary 50 of transformer D, through wires 29 and 30, front contact 28 of relay C, wires 31, 32 and 33, front contact 24—24ª of relay A, wire 34, contact 3—4 of selector S, and wire 35 to rail 1 of section M—N, and from rail 1ᵃ of section M—N through wire 36 back to secondary 50. It will be seen therefore that when contact 3—4 of selector S is closed, current is supplied to rails 1 and 1ᵃ from transformer D only when relays A and C are both closed. In order to explain the operation of the apparatus when selector contact 3—4 is closed, I will assume that relays A, B and C are all open, as when circuit controller K is open. Under this condition contacts 28 and 24—24ᵃ are both open and no current is supplied to the track rails. I will next assume that circuit controller K becomes closed. Relay A then becomes energized, closing front contact 24—24ᵃ, but the circuit for secondary 50 is still open at front contact 28 of relay C. Relay B picks up almost immediately, however, and relay C then picks up. The time required for all three relays to pick up in succession is about one-fourth second. When front contact 28 of relay C closes, the circuit for secondary 50 is closed and current is supplied to the track rails from transformer D. The closing of relay C interrupts the circuit for relay A however as hereinbefore explained and relay A commences to open. Relay A requires one-fourth second to open its front contacts after the relay is de-energized, however, and during this time interval current is supplied to the track rails. When relay A opens, the circuit for secondary 50 is opened at front contact 24—24ᵃ. At the same time the circuit for relay B is opened, and after one second relay B opens. At the expiration of one-half second after the opening of relay B, relay C opens, thereby returning the apparatus to its original condition. It follows that as long as relays A, B and C are operated, and contact 3—4 of selector S is closed, the rails will be supplied with impulses of current of about one-fourth second duration separated by intervals of about one and three-quarter seconds during which no current is supplied to the trackway. Current supplied to the trackway in the manner just described will be termed code I.

Similarly, when contact 3—5 of selector S is closed, a circuit is completed for secondary 50 including the rails 1 and 1ᵃ of section M—N over back contact 26 of relay B and front contact 28 of relay C. When this circuit is closed and circuit controller K is closed to operate relays A, B and C, current is supplied to the trackway according to code II, and the rails will then be supplied with impulses of current of about one-half second duration, separated by time intervals of about one and one-half seconds during which no current will flow in the track rails. In similar manner when contact 3—6 of selector S is closed, secondary 50 is connected with the trackway over back contact 25 of relay A and front contact 27 of relay B; when contacts 3—7 of selector S are closed secondary 50 is connected with the trackway over back contact 24—24ᵇ of relay A and front contact 28 of relay C; and when contact 3—8 of selector S is closed, a circuit is established for secondary 50 including the rails of the section M—N and front contact 28 of relay C. The characteristics of codes III, IV and V which are supplied to the trackway over the circuits just described are set out in the table appearing on the drawing. For example, when contact 3—8 of selector S is closed, current is supplied to the trackway according to code V, that is, in impulses of about one and three-quarter seconds duration separated by time intervals of about one-fourth second during which no current is supplied to the trackway.

One advantage of the transmitting apparatus embodying my invention from other forms of apparatus hitherto suggested is that the time intervals are measured by slow releasing relays which are standard pieces of apparatus and are extremely reliable in operation.

Although I have, for purposes of explanation, stated specific values for the time intervals of the various codes and for the characteristics of the timing relays A, B and C, it should be particularly pointed out that my invention is not limited to these specific values.

It should also be understood, that although I have here illustrated the transmitting apparatus supplying coded currents to the rails of a section of railway track, the currents might equally well be supplied to any other conductor.

The coded currents supplied to the trackway by means of the transmitting apparatus which I have described hereinbefore, may be used in any suitable manner such as to control traffic governing means which form no part of my present invention and which are omitted from the drawing for the sake of simplicity.

Although I have herein shown and described only one form of transmitting apparatus embodying my invention, it is understood that various changes and modifications may be made therein within the scope of the appended claims without departing from the spirit and scope of my invention.

Having thus described my invention, what I claim is:

1. In combination with a stretch of railway track, a series of relays operating in cascade, a source of current, and means for connecting said source with at least one rail of said section in series with a contact on at least one of said relays.

2. In combination with a conductor, a series of slow acting relays, means for repeatedly energizing and de-energizing said relays in cascade, a source of current, and means for at times connecting said source with said conductor over contacts on certain of said relays.

3. In combination with a conductor, a series of slow acting relays, means for repeatedly energizing and de-energizing said relays in cascade, a source of current, and a selector for connecting said source with said conductor over contacts on selected ones of said relays.

4. In combination with a stretch of railway track, a series of slow releasing relays, means for repeatedly energizing and de-energizing said relays in cascade, a source of current, a selector, and a plurality of circuits controlled by said selector and all including at least one rail of said stretch and each including different contacts or combinations of contacts on said relay.

5. In combination with a stretch of railway track, a series of slow releasing relays, means for repeatedly energizing and de-energizing said relays in cascade, a source of current having one terminal constantly connected with one rail of said stretch, and a selector for connecting the remaining terminal of said source with the other rail of said stretch through selected contacts of said relays.

6. In combination with a stretch of railway track, a series of slow acting relays, a circuit for each said relay except the first controlled by the preceding relay in the series, a circuit for said first relay controlled by the last relay of the series, and means controlled by said relays for supplying coded current to the rails of said stretch.

7. In combination with a stretch of railway track, a series of slow releasing relays, a circuit for the first relay of said series including a back contact of the last relay of the series, a circuit for each of the remaining relays including a front contact of the preceding relay in the series, and means controlled by said relays for supplying coded current to the rails of said stretch.

In testimony whereof I affix my signature.

ANDREW J. SORENSEN.